United States Patent [19]

Cahn et al.

[11] Patent Number: 4,956,161

[45] Date of Patent: Sep. 11, 1990

[54] PROCESS FOR REMOVING SO FROM A GASEOUS MIXTURE (OP-3409)

[75] Inventors: Robert P. Cahn, Millburn; Boyd E. Hurst, Long Valley, both of N.J.

[73] Assignee: Exxon Research and Engineering Company, Florham Park, N.J.

[21] Appl. No.: 296,635

[22] Filed: Jan. 13, 1989

[51] Int. Cl.$^5$ .................... C01B 21/00; C01B 17/00
[52] U.S. Cl. .................................. 423/235; 423/242
[58] Field of Search .......... 423/242 A, 242 R, 244 A, 423/244 R

[56] References Cited

U.S. PATENT DOCUMENTS 3,843,789 10/1974 Spector et al. ...................... 423/242
3,900,554 8/1975 Lyon .................................... 423/235
4,325,713 4/1982 Rosenberg et al. ................. 423/242

*Primary Examiner*—Gregory A. Heller
*Attorney, Agent, or Firm*—Roy J. Ott

[57] ABSTRACT

A gas desulfurization process is provided in which a gaseous mixture comprising sulfur oxides is contacted in an absorption zone, at absorption conditions, with an aqueous composition comprising ammonium carbonate, or ammonium bicarbonate or mixtures thereof, in an amount such that the product of the partial pressures of the sulfur oxides and ammonia over said aqueous composition is below a specified limit, to produce a gaseous product having a decreased content of sulfur oxides and a decreased appearance of blue haze. A combination nitrogen oxides removal (deNO$_x$) and desulfurization (deSO$_x$) process is also provided.

23 Claims, 1 Drawing Sheet

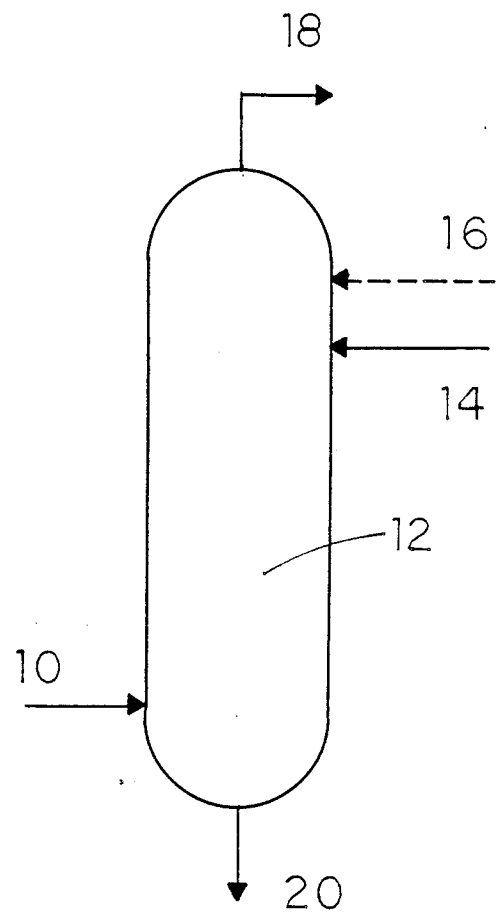

PROCESS FOR REMOVING SO FROM A GASEOUS MIXTURE (OP-3409)

BACKGROUND OF THE INVENTION

1. Field of the Invention

The present invention relates to a process for removing sulfur oxides from gaseous mixtures.

2. Description of Information Disclosures

It is known to use ammonia or ammonia precursors to remove sulfur oxides from gaseous mixtures, such as combustion effluents.

U.S. Patent No. 4,029,752 disclose a method for removing sulfur oxides from gaseous mixtures utilizing ammonia to produce elemental sulfur. The gaseous mixture containing sulfur oxides is reacted first with ammonia to form ammonium salts, such as ammonium sulfate or ammonium sulfite, and subsequently the recovered ammonium salts are decomposed at elevated temperatures to form elemental sulfur.

U.S. Pat. No. 4,288,420 discloses a process for removing nitrogen oxides nd sulfur oxides from a flue gas by reaction in the presence of a catalyst, with excess ammonia to reduce the nitrogen oxides and form ammonium sulfate which is collected with the coal ash particles. The gas leaving the collector passes to a desulfurization unit. The coal ash particles containing ammonium sulfate are heated to release some of their contained ammonia for recycle to the $NO_x$ removal step.

U.S. Pat. No. 4,400,363 discloses first removing $SO_x$ and thereafter removing $NO_x$ from flue gases by reaction with ammonia. See column 3, line 45 to column 4, line 3. The $NO_x$ removal reaction is catalytic.

U.S. Pat. No. 4,272,497 discloses simultaneously removing $NO_x$ and $SO_x$ from waste gases by reacting the gases with ammonia as shown in FIG. 5. The $NO_x$ removal reaction is catalytic. In catalytic $deNO_x$ reaction processes, such as those of U.S. Pat. No. 4,400,363 and U.S Pat. No. 4,272,497, the excess ammonia for the $deNO_x$ reaction could not be usefully employed for the $SO_x$ removal stage.

U.S. Pat. No. 4,051,225 discloses a process in which flue gas is treated, catalytically or non-catalytically, with ammonia to remove $NO_x$ and $SO_x$ to produce nitrogen and ammonium hydrogen sulfate. The molar ratio of ammonia to $SO_3$ and the steam concentrations are maintained within specified amounts. thereby severely limiting the amount of excess ammonia available for the $deNO_x$ step. Such a process has a high steam requirement which also results in a high water content in the treated flue gas.

U.S. Pat. No. 3,900,554 discloses a method for removing NO from a combustion gas in the presence of oxygen by reaction with ammonia. Although the reaction can be conducted with as little as 0.4 mole $NH_3$ per mole NO, if it is desired to reduce less than 100% of the NO present in the gas, it is preferred to use a higher mole ratio of ammonia per mole NO and thereby provide an excess amount of ammonia to obtain better results. After the reaction, the excess ammonia must be removed or utilized. See also U.S. Pat. No. 4,507,269.

U.S. Pat. No. 4,325,713 discloses scrubbing $SO_x$ from a flue gas with an aqueous ammonium or sodium alkali $SO_x$ sorbent liquor selected from ammonium carbonate, ammonium bicarbonate, sodium hydroxide, sodium carbonate, sodium bicarbonate and mixtures thereof. See also U.S. Pat. No. 4,620,856.

U.S. Pat. No. 4,321,241 discloses a process for the desulfurization of flue gas using an ammonia-containing aqueous washing solution to which ammonia has been added. The addition of ammonia is controlled to provide a predetermined amount of ammonium carbonate in the washing solution.

Allowed U.S. patent application Ser. No. 933,112 filed Nov. 21, 1986 sets forth a combination denitrogenation and desulfurization process in which the nitrogen oxides in a gaseous mixture comprising nitrogen oxides ($NO_x$) and sulfur oxides ($SO_x$) are reacted with excess ammonia or ammonia precursors, and the resulting gaseous product comprising unreacted ammonia and $SO_x$ is passed to a gas desulfurization zone into which supplemental ammonia may be added.

The problem with the processes in which ammonia or aqueous ammonium compound-containing compositions having a high ammonia partial pressure are used to remove sulfur oxides from gaseous mixtures is the appearance of a blue haze in the gaseous effluent of the gas dssulfurization zone. The blue haze is believed to be caused by the dispersion in the gaseous effluent of submicron ammonium sulfite and/or sulfate particles formed in the gas phase reaction of ammonia with the sulfur oxides.

It has now been found that the appearance of a blue haze can be decreased or eliminated if the $SO_x$-containing gas is treated with an absorbent aqueous composition comprising specified ammonium salts in an amount such that the product of the partial pressures of the $SO_x$ and $NH_3$ over the aqueous composition is below a specified limit. Therefore, the tendency for $SO_x$ to react with ammonia in the gas phase is expected to be minimized since the reaction of $SO_x$ with the ammonium salts will proceed predominantly in the liquid phase.

SUMMARY OF THE INVENTION

In accordance with the invention, there is provided a process for removing sulfur oxides from a gaseous mixture containing the same, which comprises contacting, in an absorption zone, at absorption conditions, said gaseous mixture with an aqueous composition comprising an ammonium salt selected from the group consisting of ammonium carbonate, ammonium bicarbonate, and mixtures thereof, in an amount such that the product of the partial pressures of said sulfur oxides and ammonia over said aqueous composition, measured at 140 degrees F., is not greater than about 5 (mm Hg)$^2$, in said absorption zone, to produce a gaseous product having a decreased content of said sulfur oxides.

In accordance with the invention, there is also provided a process in which the above described $SO_x$ removal step is integrated with a nitrogen oxides removal step ($deNO_x$).

BRIEF DESCRIPTION OF THE DRAWING

The FIGURE is a schematic flow plan of one embodiment of the invention.

DESCRIPTION OF THE PREFERRED EMBODIMENTS

One embodiment of the invention will be described with reference to the FIGURE. Referring to the FIGURE, a gaseous mixture comprising one or more types of sulfur oxides, hereinafter designated $SO_x$, to be purified, is introduced by line 10 into an absorption zone 12, such as a countercurrent gas-liquid contacting zone. The contacting zone may contain contacting means such as trays, packed beds or other contacting devices. The gaseous mixtures to be treated by the process of the invention may contain from about 50 to about 50,000 parts per million (ppm) $SO_x$ based on the total gaseous mixture to be treated. The $SO_x$-containing gaseous mixture of line 10 may be derived from any source, such as combustion gases, gases obtained from acid sludge decomposition, smelter gases and the like. The process is particularly suited to treat combustion effluents, that is, gases which flow out from a region of combustion. An aqueous absorbent composition comprising an ammonium salt selected from the group consisting of ammonium carbonate, ammonium bicarbonate, and mixtures thereof, is introduced into absorption zone 12 by line 14. Preferably, a mixture of ammonium carbonate and ammonium bicarbonate is present in the initial (fresh or unused) aqueous absorbent composition. The absorbent aqueous composition may be a solution or a slurry. The concentration of the ammonium salt (or salts) in the initial aqueous composition and the mole ratio of ammonium salt to sulfur oxides in the gaseous mixture to be treated is selected to be such that the product of the partial pressures of said sulfur oxides and ammonia over the aqueous composition, measured at 140 degrees F. (60 degrees C.) is not greater than 5, preferably less than about 2, more preferably less than about 1 (mm Hg)$^2$ anywhere in absorption zone 12. Suitable concentration ranges include from about 15 to 65, preferably from about 25 to about 60 weight percent, calculated as if sll the salt or salts existed as ammonium carbonate, or stated differently, such that the ammonium salt, calculated on the basis of the mole ratio of $CO_2$ to $NH_3$ in the initial absorbent composition is at least about 0.5:1, preferably at least 0.75:1. The absorbent composition may be introduced as a solution or as a slurry of saturated solution and undissolved carbonate salt. A sufficient amount of the aqueous absorbent composition is introduced into absorption zone 12 to provide a mole ratio of at least 1.0 mole of ammonia contained in the ammonium salt per mole of sulfur oxide present in the gaseous mixture, preferably s mole ratio of ammonia in said salt to sulfur oxide ranging from about 1:1 to 10:1, more preferably from about 1.0:1 to about 6:1. The large excess above 1.0:1 is for the purpose of providing an ammonia reserve for the contingency of large fluctuations in $SO_x$ input, and thus, permit reasonable process control as shown in U.S. Pat. No. 4,321,241. Optionally, water may be introduced into the upper portion of absorption zone 12 by line 16 for the purpose of recovering ammonia in the scrubbed flue gas to minimize the loss of this material and to avoid pollution problems due to ammonia in the absorption zone effluent. The absorption zone is maintained at absorption conditions so that contact of $SO_x$-containing gaseous mixture with the ammonium salt-containing aqueous absorbent composition removes at least portion of the sulfur oxides ($SO_2$ and/or $SO_3$) from the gaseous mixture of line 10 by formation of ammonium sulfate and/or ammonium sulfite in the absorbent composition and evolution of gaseous carbon dioxide, thereby producing a gaseous product (absorption zone effluent) having a decreased amount of $SO_x$ and containing the carbon dioxide formed by the reaction in the absorption zone.

In conventional flue gas desulfurization processes in which an ammonia-comprising aqueous solution is used as absorption composition (i.e. scrubbing composition), the partial pressure of ammonia over the solution is very high. In contrast, the partial pressure of ammonia over the ammonium salt solution of the present is significantly lower. This can be seen from Table I which shows calculated ammonia partial pressures at 140 degrees F. (60 degrees C.) over aqueous solution comprising 5 wt. % total ammonia (free and combined) as follows:

(a) ammonium hydroxide as sole component
(b) $CO_2$/$NH_3$ mole ratio of 0.5/1, i.e. ammonium carbonate
(c) $CO_2$/$NH_3$ mole ratio of 0.75/1. i.e. equimolal ammonium carbonate/ammonium bicarbonate mixture.

TABLE I

Partial Pressure of $NH_3$, mm $H_g$, over $NH_3$-comprising aqueous solutions, at 60 degrees C. (140 degrees F.)

| Solution | $CO_2$/$NH_3$ Mole Ratio | $NH_3$ Partial Pressure mm $H_g$ |
|---|---|---|
| (a) ammonium hydroxide | 0 | 217 |
| (b) ammonium carbonate | 0.5 | 50 |
| (c) 1/1 ammonium carbonte/bicarbonate | 0.75 | 16.3 |

All solutions contain 5 wt. %. Total $NH_3$

When the total ammonia in the solution is decreased, the partial pressure of ammonia above the solution will also be lowered, thus 2 wt. % total $NH_3$ solutions will exhibit only 40% of the partial pressure of 5 wt. % solutions; 1 wt. % $NH_3$ solutions will exert only 20% of the $NH_3$ partial pressure shown for 5 wt. % solutions, etc. Therefore, making the absorbent solution more dilute is a method of decreasing the ammonia partial pressure over the solutions.

As previously mentioned, a problem with the use of ammonia-based flue gas desulfurization processes is that they exhibit an undesirable blue haze (visible plume) in the atmosphere believed to be caused by the gas phase formation of solid ammonium sulfite/bisulfite and ammonium sulfate/bisulfate crystals during the treating step. The resulting solid-in-gas suspension is very difficult to eliminate, and intensive water scrubbing of the suspension is required to solubilize the highly dispersed salt particles. The finely dispersed salts are believed to be formed by the gas phase reaction of the sulfur oxides with ammonia present in the vapor phase. When the salt is formed in the liquid phase, no such blue haze appears, nor can it be generated from a concentrated ammonium sulfite/sulfate solution except by spray drying with a nozzle generating a highly atomized spray. The latter does not occur in a countercurrent absorption zone (i.e. gas scrubbing tower), pointing to the direct gas phase formation of the above mentioned salts as the source of the blue haze formation.

The gas phase formation of solid ammonium salts is a function of the temperature and the partial pressure of the reactants, $SO_2$, $SO_3$, $NH_3$, and $H_2O$. Temperature is important since the ammonium salts involved, sulfite as well as sulfate are thermally unstable and will decompose above certain temperatures. The sulfate only decomposes at relatively elevated temperatures, so this is less of a consideration, but then only 10% or less of the total $SO_x$ in the flue gas is in the form of $SO_3$ which leads to sulfate formation. In contrast, the ammonium sulfite salts are very thermally unstable and will decompose (as well as not form) above about 155–160 degrees F. Consequently, the formation of solid ammonium sulfite/bisulfite, the believed source of blue haze will be very dependent on the $SO_2$ and $NH_3$ partial pressure. This would be so even if the actual composition of the solids making up the blue haze were principally ammonium sulfate, since this sulfate is easily produced by air oxidation of the solid ammonium sulfite once it is formed.

Formation of solid ammonium sulfite-bisulfite under given conditions in the absorption zone (i.e. $SO_x$ removal zone) are expected to be decreased or eliminated if the partial pressures of the main reactants, namely, ammonia and sulfur oxides, are kept below the level where a gas phase reaction can occur. The limiting condition can be expressed by specifying that the product of the partial pressures, expressed in millimeters of mercury (mm Hg), of the sulfur oxides in the gaseous mixture being treated and the ammonia over the aqueous absorbent composition, measured at 140 degrees F. (60 degrees C.) is not greater than about 5 $(mm\ Hg)^2$, preferably not greater than about 2 $(mm\ Hg)^2$, preferably not greater than 1 $(mm\ Hg)^2$, in the absorption zone. It is expected that solid formation can be prevented by using this partial pressure product limitation in conducting the absorption step under conditions in which there is a relatively high $NH_3$ partial pressure, provided the $SO_x$ partial pressure is very low, as well as at high $SO_x$ pressures, provided the ammonia partial pressure is very low.

The $SO_2$ partial pressure in the gas entering the gas-liquid contacting zone (i.e. scrubber tower) is fixed, depending solely on the sulfur content of the fuel and the combustion conditions (excess air and percent conversion of the fuel sulfur into gaseous $SO_x$). Thus, a 3% residual oil fuel burning with 10 to 20% excess air will produce a flue gas comprising 1400 ppm $SO_x$. This means that the partial pressure of the $SO_x$ in the gas entering the atmospheric pressure absorption zone 12 via line 10 will be 1 mm Hg. The $SO_2$ partial pressure of the gas leaving gas-liquid contacting zone 12 via line 18, assuming 90% or more removal of the $SO_x$ will be 0.1 mm Hg or less. The ammonia partial pressure over the aqueous absorbent composition descending absorption zone 12 between inlet 14 and exit 20 will not change significantly since, in order to assure good $SO_2$ removal, an excess of $NH_3$-comprising aqueous absorbent composition (e.g. treating solution) is used and the solution is frequently recirculated from 20 back to the top at 14. Consequently, the most critical point for blue haze formation is expected to be at the bottom of the absorption zone, and will be dependent on the ammonia partial pressure over the aqueous absorption composition.

As shown in Table I, the ammonia partial pressure over an aqueous ammonia solution is more than tenfold that over an ammonium carbonate/and or bicarbonate solution comprising the same amount of total ammonia. Furthermore, since the $SO_x$ are anhydrides of stronger acids than $CO_2$, the neutralizing capacity of the ammonia in the aqueous ammonia solution is exactly as high as that in the ammonium carbonate/bicarbonate solution, since the $SO_x$ will completely replace the $CO_2$ in the latter. Consequently, the carbonate/bicarbonate solution is as good an $SO_x$-scrubbing solution as aqueous ammonia but with a much lower $NH_3$ partial pressure.

It should be noted that the aqueous absorption composition at the bottom of absorption zone 12, believed to be the most critical region for the formation of blue haze solid salt particles, will not be aqueous ammonia or ammonium carbonate/bicarbonate, but solutions in which some of the ammonium basicity is neutralized by $SO_x$, such as $SO_2$. The extent to which the ammonia in these solutions is neutralized by $SO_2$ will depend on the specific operating conditions, the amount of recycle, the extent of ammonia utilization per pass, but the ammonia partial pressure depressing effect of the carbonate and/or bicarbonate system is evident from the values given in Table II, which again shows systems at 140 degrees F. (60 degrees C.), 5 wt. % total $NH_3$, but now with some ammonia neutralized with varying amounts of $SO_2$.

Systems comprising 0; 0.20, and 0.4 mole $SO_2$ per mole $NH_3$ are tabulated, again showing the calculated partial pressures over the following three different solutions:

(a) assuming the $NH_3$ not tied up by the $SO_2$ to be free ammonia.
(b) assuming the above untied $NH_3$ to be in the form of ammonium carbonate.
(c) assuming the above untied $NH_3$ to be in the form of a 1/1 ammonium carbonate/ammonium bicarbonate composition.

Note that the values for the zero mole/mole $SO_2/NH_3$ solutions are the same as those in Table I.

TABLE II

| | Partial pressure, mm Hg, of $NH_3$ over aqueous solutions comprising $NH_3$, $CO_2$ and $SO_2$ at 140 degrees F. (60 degrees C.). All solutions contain 5 wt. % total $NH_3$. | | | | | |
|---|---|---|---|---|---|---|
| | 0 | | 0.2 | | 0.4 | |
| $SO_2/NH_3$, mol/mol Solutions | $CO_2/NH_3$ mol/mol | $NH_3$ p.p. mm Hg | $CO_2/NH_3$ mol/mol | $NH_3$ p.p. mm Hg | $CO_2NH_3$ mol/mol | $NH_3$ p.p. mm Hg |
| ammonium hydroxide | 0 | 217 | 0 | 130 | 0 | 47 |
| ammonium carbonate | 0.5 | 50 | 0.4 | 11 | 0.3 | 2 |
| 1/1 ammonium carbonate/bicarbonate | 0.75 | 16.3 | 0.6 | 3 | 0.45 | <1 |

Table II shows that in solutions containing $SO_2$, the addition of $CO_2$ has a much more pronounced depressing effect on the $NH_3$ partial pressure than in the non-$SO_2$-containing systems shown in Table I. However, it should be noted that some of the high $CO_2$-containing systems in Table II have total pressures exceeding 760 mm Hg, and will, therefore, tend to evolve $CO_2$ to reach vapor pressure equilibrium.

In summary, the addition of $CO_2$ to the aqueous absorbent compositions depresses the $NH_3$ partial pressure over the solution, whether it contains $SO_2$ or not, and this reduction in the $NH_3$ partial pressure at the most critical portion of the absorption zone, namely, at the bottom of the absorption zone where the incoming flue gas first meets the absorbent composition is believed to be sufficient to minimize formation of a blue haze. Moreover, it is known that the aqueous ammonia solution contacting a flue gas will absorb $CO_2$ as well as $SO_2$. However, it is well known that the absorption of $SO_2$ into an aqueous alkaline solution is rapid, while the absorption of $CO_2$ is very slow. Consequently, although a certain amount of ammonium carbonate will buildup in the circulating solution as a result of this $CO_2$ absorption, if free ammonia is added to the fresh absorbent entering absorption zone 12 at 14, free ammonia will be left in the solution at the bottom of the absorption zone, unless the amount of $NH_3$ added at the top is less than the stoichiometric amount required to neutralize the $SO_2$, absorbed in the absorption zone. It can be seen from Table II that if free $NH_3$ (not tied up with $SO_2$ nor with $CO_2$) is left in the solution, its $NH_3$ partial pressure will be quite high. The best way to avoid this undesired occurrence is to make up fresh ammonia reagent not in the form of anhydrous or aqueous ammonia, but in the form of ammonium carbonate, ammonium bicarbonate or mixtures thereof. In that case, the possibility of the presence of free ammonia with its concomitant high $NH_3$ partial pressure, at the critical bottom of the gas-liquid absorption zone, will be minimized, even when some $CO_2$ is given off from the solution during its descent through the absorption zone.

Systems in which ammonium hydroxide is the scrubbing agent (i.e. absorbent), and circulating ammonium carbonate system where make-up ammonia is in the form of anhydrous or aqueous ammonia operate with the continuous emission of a blue haze. Systems where the circulating solution is an ammonium carbonate and/or bicarbonate solution also comprising sulfite and sulfate, and where the make up consists of carbonate/bicarbonate, are not expected to exhibit a blue haze formation.

In a further embodiment of the invention, not all the make-up ammonia has to be supplied in the form of carbonate-bicarbonate. If some of it is introduced at the top in the form of free ammonia, it will react with the $SO_2$ and to some extent with the $CO_2$ in the flue gas and form ammonium sulfite and some ammonium carbonate, leaving very little free ammonia at the bottom of the absorption zone to exert an appreciable $NH_3$ partial pressure and result in blue haze. There will be enough ammonium sulfite-ammonium carbonate in the system to prevent a high ammonia partial pressure. It is expected that 50 to 75% of the average required ammonia can be introduced into the solution 14 at the top of the absorption zone as ammonia, the remainder as ammonium carbonate or ammonium bicarbonate or mixtures thereof. However, this procedure can only be used if nowhere in the absorption zone (e.g. tower) there exists blue haze forming conditions, which has been defined as the product of the $SO_X$ partial pressure and the ammonia partial pressure measured above the solution at 140 degrees F., both expressed in mm Hg, which should not exceed about 5 (mm Hg)$^2$, preferably not more than 2 (mm Hg)$^2$. This definition allows for flexibility in the allowable ammonia partial pressure of the absorbent composition as it progresses through the countercurrent absorption zone. At the bottom portion of the absorption zone, where the $SO_X$ concentration and partial pressures are a maximum of about 1400 ppm or about 1 mm Hg at atmospheric pressure, the ammonia partial pressure must be a minimum, that is, not more than 5, preferably not more than 2 mm Hg. Based on the data in Table II, this rules out any free ammonia, and at least a $CO_2/NH_3$ mole ratio corresponding to ammonium carbonate for the ammonia not tied up with $SO_x$. Thus, when the $SO_2/NH_3$ ratio is 0.4, meaning that 40% of the $NH_3$ is tied up as $(NH_4)HSO_3$ in the solution, the remainder 60% of the $NH_3$ should be present at least as $(NH_4)_2CO_3$, preferably as a 1:1 mixture of $(NH_4)_2CO_3$ and $(NH_4)HCO_3$, which will keep the ammonia partial pressure over the solution below 2, preferably below 1 mm Hg. Thus, the product of $SO_2$ and $NH_3$ partial pressures at the bottom of the absorption zone will be less than 2 (mm Hg)$^2$. Near the top of the absorption zone where the $SO_x$ partial pressure is sharply reduced as a result of the absorption occurring in the contacting zone, the $SO_x$ partial pressure may be 0.1 mm Hg or less, depending on the $SO_x$ clean-up. Thus, the ammonia partial pressure at the top of the absorption zone can be as high as 50, preferably below 20 mm Hg, in order for the product to stay below 5 and 2 (mm Hg)$^2$, respectively. Referring to Table II, and assuming that the result of some recirculation of the aqueous absorbent composition from the absorption zone bottom to top, the $SO_2/NH_3$ ratio of the absorbent composition at the top is 0.2/1, the ammonia in the absorbent composition not tied up as $(NH_4)HSO_3$ should be present as ammonium carbonate or as a mixture of ammonium carbonate and a small amount of ammonia. In these circumstances, the $NH_3$ partial pressure over the absorbent composition will be 11 mm Hg or a little higher which will give a satisfactory partial pressure product of less than 5 or 2 (mm Hg)$^2$. It is important to consider what happens to this solution as it progresses down through the absorption zone, as it absorbs both $SO_x$ such as $SO_2$ rapidly and $CO_2$, only slowly, as it contacts countercurrently the flue gas. The $SO_2/CO_2/NH_3$ composition at the top is 0.2/0.4/1.0. As the aqueous absorbent composition descends through the absorption zone, it will absorb the $SO_x$, such as $SO_2$, in the flue gas, and the $SO_2$ content of the absorbent composition will increase from a $SO_2/NH_3$ ratio of 0.2/1 to 0.4/1. This would leave the $CO_2/NH_3$ ratio at 0.4/1 unless $CO_2$ is either absorbed into the absorbent composition or evolved from it. If a small amount of $CO_2$ is absorbed from the $CO_2$-rich flue gas, the $CO_2$ content may increase from 0.4 to 0.45/1 $CO_2/NH_3$, indicating a 1:1 ammonium carbonate to bicarbonate split in the $NH_3$ not tied up by the $SO_2$. However, it may also be possible that some $CO_2$ is evolved from the descending solution, leaving it with a $CO_2/NH_3$ ratio below 0.4:1. This would indicate a greater than 1:1 ammonium carbonate to bicarbonate split in the $NH_3$ not tied up with the $SO_2$. If sufficient $CO_2$ is released from the solution to depress the $CO_2/NH_3$ ratio to 0.3/1 in the absorbent composition at the bottom of the absorption zone, then this indicates a mixture of ammonium bisulfite and only ammonium carbonate at the bottom of the absorption zone.

Whether the absorbent composition releases or absorbs $CO_2$ in the absorption zone will depend on absorption temperature, initial composition of the aqueous absorbent composition, extent of spent absorbent composition, recycle from bottom to top of the absorption zone and the $SO_2/SO_3$ ratio in the $SO_x$ in the flue gas.

It is evident that if the fresh absorbent composition introduced into the absorption zone in line 14 is aqueous ammonia or a mixture of ammonia and ammonium sulfite (as a result of recycle of spent absorbent composition from bottom to top), the spent absorbent composition at the bottom of the absorption zone will have very little $CO_2$ in it ($CO_2$ absorbs very slowly into alkaline aqueous solutions) for example, 0 to 0.05 $CO_2/NH_3$, while the $SO_2/NH_3$ ratio will be, for example, 0.2 to 0.4. Under these conditions, the ammonia partial pressure will be 130 to 47 mm Hg, too high to give satisfactory $NH_3$-$SO_2$ partial pressure product of below 5 or 2 anywhere in the absorption zone. This shows that the fresh ammonia make-up must be, to a considerable extent, in the form of ammonium carbonate or ammonium carbonate/bicarbonate. Therefore, to minimize the possibility of the appearance of a blue haze from the absorption process, the make-up ammonia introduced at the top of the absorption zone should be in the form of an ammonia/ammonium carbonate-bicarbonate mixture wherein not more than 25% of ammonia is not neutralized by a carbonate ion, preferably where all the ammonia is tied up as a carbonate ion, and most preferably where about half the carbonate exists as carbonate and the other half as bicarbonate ion. In the latter case, two thirds of the ammonia is neutralized by carbonate and one third by bicarbonate ions.

Some flue gas purification processes are conducted in an apparatus which comprises a device in which the liquid absorbent composition and the gas are contacted by energetic mixing of the two phases in a single stage contact followed by separation of the purified gas from the spent liquid, instead of being conducted in a countercurrent gas-liquid absorption tower. A Venturi scrubber is an example of such a type of gas-liquid contacting process. The process of the present invention need not be conducted in a countercurrent gas-liquid contacting zone and may be conducted in an apparatus such as a Venturi scrubber. When such an apparatus is used to conduct the gas desulfurization process of the present invention, the fresh absorbent composition or fresh absorbent composition admixed with recycle spent absorbent composition contacts the gaseous mixture comprising the sulfur oxides to be purified. Since the gaseous mixture may have a $SO_x$ content as high as 1400 ppm or more, the $SO_x$ partial pressure may be 1 mm Hg or more. In order to minimize the possibility of forming a blue haze during the gas desulfurization process, the $NH_3$ partial pressure of the absorbent composition injected into such an apparatus as described above must be below about 5, preferably below about 2 mm Hg, so that the partial pressure product remains below 5 or 2 (mm Hg)$^2$, as previously set forth. Consequently, referring to Table II and assuming the fresh and recycle liquid absorbent composition being injected into the Venturi scrubber has a $SO_2/NH_3$ mole ratio of 0.2:1, the make-up $NH_3$ must be at least in the form of a 1:1 ammonium carbonate/bicarbonate, and preferably 0.5:1 so that the $NH_3$ partial pressure be sufficiently low to minimize the formation of a blue haze.

It should be noted that for reasons such as convenience of supply, it may be easier to obtain and use anhydrous ammonia or its aqueous solution rather than an ammonium carbonate and/or ammonium bicarbonate absorbent composition; however, the use of anhydrous ammonia or its aqueous solutions in gas desulfurization processes exhibits the undesired blue haze in the atmosphere. whereas the use of the absorbent composition of the present invention with its low ammonia partial pressures will minimize the possibility of the formation of blue haze. Nevertheless, it is still possible to use aqueous ammonia in the process of the present invention by inserting a $CO_2$-absorption step in the absence of $SO_x$. In such an embodiment of the invention, the $CO_2$ absorption step can be performed on a small portion of the total scrubbed, essentially $SO_x$-free gaseous mixture either in a separate tower or in a portion of the main gas-liquid contacting zone (main tower) of the desulfurization stage. Only a small portion of the total gaseous mixture (e.g. flue gas), of the order of 1 to 10% of the total gas, is required for this step, since the $CO_2$ concentration in the gaseous mixture (flue gas) is of the order of 100 times the level of the $SO_x$ concentration. While the $SO_x$ concentration may be of the order of 1400 ppm or 0.14%, the $CO_2$ level is generally of the order of 10 to 15%, depending on the fuel, excess air, etc. However, due to the slow rate of absorption of $CO_2$ into alkaline aqueous solutions, sufficient liquid residence time must be built into this absorption system to ensure the required $CO_2$-$NH_3$ reaction in the liquid phase. While a contact time of the order of 30 seconds to 2 minutes is generally sufficient for the liquid in the scrubber tower to remove the $SO_x$, a higher residence time, of the order of 10 to 30 minutes is required in the $CO_2$-absorber to accomplish satisfactory conversion of the aqueous ammonia in the feed to ammonium carbonate/bicarbonate to be used in the $SO_x$-scrubber. Good contacting and sufficient contact time in the $CO_2$ scrubbing step may be achieved, for example, by recirculating the absorbent composition from the bottom of the $CO_2$-scrubber back to the top. This also minimizes the $NH_3$ partial pressure at the top of the tower, and reduces the load on any water washing step at the top of that tower to minimize the loss of ammonia in the $CO_2$-depleted flue gas portion leaving the top of that tower.

Suitable $SO_x$ absorption conditions include an inlet temperature of the absorbent composition during the absorption step ranging from about 100 degrees F. to about 150 degrees F. preferably from about 105 degrees F. to about 140 degrees F. Pressures may vary widely. Typically, the absorption process is conducted at atmospheric pressure. The absorption zone effluent comprising a decreased amount of sulfur oxides relative to the amount of sulfur oxides present in the gaseous mixture of line 10 and including the $CO_2$ formed by reaction with the absorbent composition, is removed overhead from the absorption zone by line 18. An aqueous medium (solution or aqueous slurry) comprising an ammonium salt of an inorganic aid of sulfur, such as ammonium sulfate, ammonium sulfite, ammonium hydrogen sulfate, ammonium hydrogen sulfite and mixtures thereof, as well as unreacted ammonium carbonate and/or bicarbonate, is removed from the bottom of absorption zone 12 by line 20 for possible recycle to the top of the absorption zone and for further processing, such as evaporation, oxidation, briquetting, conversion to elemental sulfur, etc.

In an other embodiment of the invention, the sulfur oxides removal step (i.e. desulfurization) is integrated with a nitrogen oxides ($NO_x$) removal step to purify a gaseous mixture comprising sulfur oxides as well as nitrogen oxides, as described in the following description.

The gaseous mixtures of which the content of one or more types of nitrogen oxides (hereinafter designated $NO_x$) and one or more types of sulfur oxides (hereinafter designated $SO_x$) can be decreased with the integrated process of the present invention include exhaust gases from internal combustion engines either stationary or mobile, tail gases from nitric acid plants or chemical nitration operations, exhaust gases from combustion of fossil fuels in power plants, industrial boilers, etc. Preferably, the gaseous mixture is a combustion effluent, i.e., an effluent derived from a combustion process. The exhaust gases may comprise from about 20 vppm to about 1 volume percent $NO_x$ and from about 0.005 to about 5 volume percent sulfur oxides. When the exhaust gas is derived from a combustion process, the gas may comprise from above 0 to about 20 volume percent $O_2$, typically from 0.1 to 6 volume percent $O_2$.

A gaseous mixture of the type described above, for example. a combustion effluent comprising one or more types of nitrogen oxides and one or more types of sulfur oxides is contacted, in the presence of oxygen, and in the absence of a catalyst, with a reducing agent at conditions to reduce the nitrogen oxides selectively to $N_2$. The reducing agent comprises an excess amount of ammonia or ammonia precursor such as ammonium hydroxide, ammonium formate, ammonium oxalate, ammonium carbonate, ammonium bicarbonate and mixtures thereof, and aqueous solutions thereof. Preferably, at least a portion of the ammonia is provided by using an aqueous composition comprising an ammonium salt selected from the group consisting of ammonium carbonate, ammonium bicarbonate and mixtures thereof. More preferably, at least a portion of the ammonia is provided by using an aqueous composition comprising the same ammonium salt or salts as the one used in the subsequent desulfurization step. The aqueous composition comprising an ammonium salt selected from the group consisting of ammonium carbonate, ammonium bicarbonate and mixtures thereof is sprayed into the gaseous mixture in the $deNO_x$ contacting zone. By "excess amount" is intended herein a molar ratio of ammonia to $NO_x$ greater (i.e., in excess) than the molar ratio required to reduce all the $NO_x$ present in the gaseous mixture being treated to $N_2$. The stoichiometric $NH_3/NO_x$ ratio is 1/1. Suitable molar amounts of ammonia may be equal to the sum of about 1.0 to 3.0 times the number of moles of $NO_x$ plus about 0.01 to 2.0 times the number of moles of $SO_x$ present in the gaseous mixture being treated, typically from the sum of about the moles of $NO_x$ plus 0.02 times the moles of sulfur oxides to the sum of 2.5 times the moles of nitrogen oxides plus the moles of sulfur oxides. The excess amount of ammonia which may be used will depend to a large extent on the $NO_x$ to $SO_x$ mole ratio in the gas to be treated. For example, when this ratio is ⅓, and it is desired to remove the $SO_x$ as the ammonium sulfite/sulfate salt, 2 moles of $NH_3$ per mole of $SO_x$ will be required for the $SO_x$ removal. Since, in this example, the $NO_x/SO_x$ ratio in the gas is ⅓, and the stoichiometric $NH_3/NO_x$ ratio is 1/1, the excess amount of $NH_3$ which can be usefully employed in the $SO_x$ removal step is 6 moles of $NH_3$/mole NO, indicating that a $NH_3/NO_x$ ratio in the feed gas of 7 can be employed in both the $NO_x$ and $SO_x$ removal steps. In general, the total moles of ammonia added to the process, both for nitrogen oxides removal and sulfur oxides removal, will range from about 1.0 to 2.5 times the sum of the total number of moles of said nitrogen oxides and said sulfur oxides. However, as will be described subsequently, it is advantageous not to add all the stoichiometrically required $NH_3$ for the $SO_x$ removal step as excess amount of $NH_3$ in the feed gas to the $NO_x$ removal step since there may be some undesired thermal decomposition of a fraction of this ammonia during the $deNO_x$ step, as well as some $NH_3$ oxidation. Therefore, the excess amount of $NH_3$ added to the raw feed gas to the $deNO_x$ step, is limited to the marginal optimum excess amount, defined as the excess amount above which no improvement in the degree of denitrogenation is achieved. This marginal optimum excess amount of $NH_3$ is in the range of about 0.1 $NH_3/NO_x$ mole ratio to about 5.0, typically 1.0 to 3.0.

While excess amounts of $NH_3$ above this marginal optimum amount can effectively be used up in the $SO_x$ removal step, their presence does not significantly improve the $NO_x$ removal efficiency and may lead to potentially excessive $NH_3$ loss due to thermal and oxidative decomposition. Therefore, if the $NO_x/SO_x$ ratio is such that the required $NH_3$ for the $SO_x$ removal would indicate a tolerable excess amount of $NH_3$ of 5/1, $NH_3/NO_x$ mole ratio, i.e., a 6/1 $NH_3/NO_x$ ratio in the feed gas to the $deNO_x$ step and if the marginal optimum excess amount is only 1/1, then it is preferred to operate as closely as possible to an excess amount of 1/1, i.e., have an $NH_3/NO_x$ mole ratio of 2/1 in the feed to the $deNO_x$ step, but add the additional $NH_3$ as part of the $deSO_x$ step, so that the temperatures will be lower and the $NH_3$ losses due to thermal and oxidative decomposition will be minimized. To reduce all the $NO_x$ present in the gas to $N_2$, at least 1 mole $NH_3$ per mole $NO_x$ is required. The ammonia may be derived from a suitable precursor. The $NO_x$ reduction step may be conducted at a temperature ranging from about 1300 to about 2200 degrees F. When ammonia alone is used as reducing agent, the preferred temperature may range from 1600 to 2200 degrees. When ammonia is used with an additional reducing agent, such as hydrogen, a temperature ranging from about 1300 to about 1600 degrees F. may be used. Suitable amounts of molecular oxygen in the $NO_x$ reduction step include at least about 0.1 volume percent. preferably a range from about 0.1 to 20 volume percent, typically from 0.1 to 6 volume percent based on the gaseous mixture to be treated. The molecular oxygen may be present in the gas to be treated such as in combustion effluents or a suitable amount of oxygen may be added to give the desired amount. Suitable additional reducing agents include paraffins, olefins, aromatic hydrocarbons, oxygenated hydrocarbons, nitrogenated hydrocarbons. sulfonated hydrocarbons, carbon monoxide and hydrogen. Hydrogen is the preferred additional reducing agent suitably added at a hydrogen to ammonia ratio of less than 10, preferably less than 3. However, it should be noted that compared to a stand-alone (i.e., non-integrated) $deNO_x$ process, there is less need for the use of an additional reducing agent in the integrated $deNO_x/deSO_x$ process of the present invention because the excess ammonia can be used advantageously to reduce the amount of an additional reducing agent, since the combined operation disposes of the excess $NH_3$ which is presently unused in the effluent of the $deNO_x$ step. It should be noted, however, that the ability to use higher molar ratios of $NH_3/NO_x$ than in stand-alone $deNO_x$ processes also permits the use of wider ratios of additional reducing agents to ammonia than would be possible in stand-alone operations. The pressure during the $NO_x$ reduction step may range from 0.1 atmosphere to 100 atmospheres. The residence time of the reaction of the $NO_x$ and $SO_x$-containing feed gas with the ammonia may range from 0.001 to 10 seconds. Contact of the feed gas with the ammonia (or ammonia precursor) at the $NO_x$ reduction conditions produces a gaseous effluent comprising unreacted ammonia, sulfur oxides, nitrogen and $H_2O$.

The effluent from the denitrogenation zone may pass through one or several energy recovery steps before being introduced into the desulfurization zone. These energy recovery steps may be heat recovery, e.g. for the purpose of raising steam, or gas expansion, e.g. for the purpose of direct power generation from the hot flue gas.

At least a portion of the entire $NO_x$ reduction zone gaseous effluent comprising unreacted ammonia then is passed to an absorption zone (desulfurization zone) to contact an aqueous absorbent composition comprising an ammonium salt selected from the group consisting of ammonium carbonate, ammonium bicarbonate and mixtures thereof. The concentration of the ammonium salt in the absorbent composition may range from about 15 to about 65 wt. %, calculated as if all the salt or salts existed as ammonium carbonate. A sufficient amount of the aqueous ammonium salt absorbent composition is introduced into the absorption zone to provide a mole ratio of at least 0.5 mole of ammonium salt (expressed as ammonium carbonate) per mole of sulfur oxide present in the gaseous effluent, preferably a mole ratio of salt to sulfur oxide ranging from about 0.5:1 to about 5:1, more preferably from about 0.55:1 to about 1.2:1. The concentration of the ammonium salt (or salts) in the initial composition and the mole ratio of ammonium salt to sulfur oxides in the gaseous mixture to be treated are selected in such a manner that the product of the partial pressure of said sulfur oxides and ammonia over the aqueous composition, measured at 140 degrees F. is not greater than about 5, preferably less than about 2, more preferably less than about 1 (mm Hg)$^2$ anywhere in the absorption zone.

The same constraints as to permissible $NH_3$ partial pressure over the absorbent composition, as described relative to the $SO_x$-only removal operation (i.e. non-integrated desulfurization process), apply to the combined $deNO_x$-$deSO_x$ operation to minimize the possibility of blue haze formation. It should be noted that the excess $NH_3$ (unreacted $NH_3$) present in the $deNO_x$ stage effluent of the order of 500 ppm or less, is far too low to cause blue haze formation ahead of the $deSO_x$ absorption zone. At atmospheric pressure, 500 ppm $NH_3$ corresponds to a partial pressure of about 0.4 mm Hg, so that the partial pressure product of $NH_3$ and $SO_2$, which must be below 5, preferable below 2 (mm Hg)$^2$, will only be 0.4 (mm Hg)$^2$, when the $SO_2$ content is 1400 v ppm (partial pressure of 1.06 mm Hg). Therefore, the excess (unreacted) $NH_3$ in the $deNO_x$ effluent does not, by itself, cause a blue haze problem, but if additional ammonia is added as such or as aqueous ammonia, then aqueous ammonium carbonate and/or ammonium bicarbonate solution the ammonia partial pressure would exceed tolerable limits and the formation of blue haze would be expected to occur. However, addition of the stoichiometrically required $NH_3$ in the form of will provide a sufficiently low $NH_3$ partial pressure to minimize formation of a blue haze.

It should be noted that the presence of some $NH_3$, the unreacted ammonia from the $deNO_x$ step, in the feed to the $deSO_x$ absorption tower does not affect the liquid absorbent concentration and composition consideration at the bottom of the absorption tower, such as set forth above. The $NH_3$ in the feed gas and the ammonia in the vapor phase above the solution as a result of the ammonia vapor pressure are not additive but are fixed by vapor pressure considerations. However, to ensure that the composition of the absorbent solution at the bottom of the absorption tower in the combined $deNO_x$-$deSO_x$ process, has as high a $CO_2/NH_3$ ratio as in the absorption tower of the $deSO_x$ alone (non-integrated) embodiment, additional $CO_2$ may be introduced into the absorption zone with the fresh absorbent composition entering at 14. This additional $CO_2$ should be at least 1 mole/mole $NH_3$ entering the bottom of the absorption zone as excess (unreacted) $NH_3$, preferably 1.5 mole/mole $NH_3$. Therefore, if the unreacted $NH_3$ from the $deNO_x$ stage represents x % of the total stoichiometric $NH_3$ requirement for $deSO_x$ absorption stage, and a stand-alone (i.e. non-integrated) $deSO_x$ would require for its $NH_3$ make-up to be fed as 0.5/1 $CO_2/NH_3$ solution, the integrated $deSO_x$-$deNO_x$ process's $deSO_x$-absorption zone make-up should be 0.5/(1−0.01x) $CO_2/NH_3$, preferably 0.5/(1−0.015x) $CO_2/NH_3$.

Thus, if the unreacted $NH_3$ from $deNO_x$ represents 20% of the total $NH_3$ required for $deSO_x$-absorption, and previously mentioned considerations would have required that, for the stand-alone (non-integrated) $deSO_x$ process, the ammonia be fed as ammonium carbonate i.e. $CO_2/NH_3$=0.5/1, then for the integrated $deNO_x$-$deSO_x$ process, the top of the absorption zone should be fed a make-up $NH_3$ solution with a $CO_2/NH_3$ mole ratio of at least 0.5/(1−0.20)=0.625/1.

The treated gas product, having a decreased amount of $SO_x$, is removed from the absorption zone and may be vented to the atmosphere. Suitable conditions in the absorption zone include a temperature ranging from about 100 degrees F. to about 150 degrees F., preferably a temperature ranging from about 105 degrees F. to about 140 degrees F., and atmospheric pressure. The reaction of the sulfur oxides with the ammonium carbonate and/or ammonium bicarbonate at these conditions results in the formation of ammonium salts of inorganic acids of sulfur in the aqueous liquid medium and evolution of carbon dioxide gas. The latter is removed from the absorption zone with the treated gaseous effluent.

The aqueous liquid medium (solution or slurry) comprising the ammonium salts of inorganic acids of sulfur is removed from the absorption zone. It may be desirable to remove a substantial portion of the water associated with the ammonium salts. The ammonium salts may be recovered and used as such for further use or the recovered salts may be decomposed to form elemental sulfur.

When the ammonium salts are to be recovered as such for use, for example, as fertilizer or as a component of a fertilizer composition, it may be desirable to convert any ammonium sulfite that may be present in the recovered ammonium salts to ammonium sulfate by oxidation in a conventional way such as, for example, by air blowing of the salt solution.

When it is desired to produce elemental sulfur, the ammonia to $SO_x$ mole ratio in the recovered ammonium salts should be at least equal to the stoichiometric quantity for conversion of the chemically combined sulfur in the recovered ammonium salts to elemental sulfur, for example, a mole ratio of at least 4/3 when all the sulfur in the salts is present as sulfite. When all the sulfur in the recovered salts is present as sulfate, the stoichiometric ratio is 2/1. The decomposition of the ammonium salts to elemental sulfur may be performed according to any known method. A method is described in U.S. Pat. No. 4,029,752, the teachings of which are hereby incorporated by reference, in which the ammonium salts are decomposed by high temperature oxidation-reduction reaction into a mixture comprising elemental nitrogen and elemental sulfur in one or two steps. In the one step method, the ammonium salts are introduced into a high temperature reaction zone maintained at a temperature of 500 to 3000 degrees F., preferably 900 to 1500 degrees F. and, optionally, in the presence of a catalyst. When the decomposition of the ammonium salts to elemental sulfur is thermal, a preferred decomposition temperature is above 1200 degrees F., more preferably from about 1500 to about 3000 degrees F. When the decomposition of the ammonium salts to elemental sulfur is performed in the presence of a conventional catalyst, the decomposition temperature may range preferably from about 500 to about 2000 degrees F., more preferably from about 900 to about 1500 degrees F. Alternatively, the ammonia salts may be decomposed in two steps by first decomposing the ammonium salts thermally at a temperature ranging from 225 degrees F. to 800 degrees F. into a gaseous mixture comprising ammonia, sulfur oxides ($SO_2$ and $SO_3$) and water vapor. The gas mixture resulting from the first step, if desired after removal of water vapor, is subsequently introduced into a high temperature reaction zone where the ammonia reacts with the sulfur oxides at a temperature ranging from 500 to 3000 degrees F. to form a reaction product comprising nitrogen and elemental sulfur.

The following prophetic examples and comparative examples, all of which are paper examples, are presented to illustrate the invention.

COMPARATIVE EXAMPLE A

A flue gas from the combustion of a 3% sulfur residual oil, comprising 1400 vppm $SO_x$, is contacted (scrubbed) with an aqueous solution comprising 5 wt. % $NH_3$ to remove 95% of the contained $SO_x$. For purpose of this example, it is assumed that the $SO_x$ is considered to be all $SO_2$.

Contacting is performed at 140 degrees F. by mixing a 20% stoichiometric excess of the ammonia solution together with any water effluent from an $NH_3$ absorption tower, with the flue gas which has been cooled to 140 degrees F. (60 degrees C.), separating the two phases, and recovering any ammonia in the treated flue gas by scrubbing with water in a countercurrent $NH_3$ absorption tower.

The treated flue gas leaving the unit will exhibit a blue haze (visible plume) believed to be the result of the formation of colloidal ammonium sulfite/bisulfite suspension, which is not removed by countercurrent water scrubbing in the $NH_3$ absorption tower.

In this operation, the $SO_2$ partial pressure in the contacting zone starts at 1.06 mm Hg and drops to 5% of this value, or 0.053 mm Hg. The $NH_3$ partial pressure of the initial 5 wt. % aqueous $NH_3$ solution is over 215 mm Hg, and drops to about 40 mm Hg, since over 80% of the $NH_3$ is neutralized by the $SO_2$. The $NH_3$ and $SO_2$ partial pressure products in the contactor are:

Initial $P_{SO_2} \times P_{NH_3} = 1.06 \times 215 = 228$ (mm Hg)$^2$

Final $P_{SO_2} \times P_{NH_3} = 0.053 \times 40 = 2.1$ (mm Hg)$^2$

COMPARATIVE EXAMPLE B

The same flue gas as in Comparative Example A is again treated with a 20% excess of a 5 wt. % aqueous $NH_3$ solution, but treatment is carried out in a multi-stage countercurrent contacting tower provided with a top scrubbing section where water is used, as previously, to recover $NH_3$ left in the treated flue gas.

Again, a blue haze is found which persists throughout the scrubbing system and leaves the plant with the treated flue gas.

The partial pressure of $NH_3$ and $SO_2$ and the partial pressure product, at the top and bottom of the $SO_2$ removal tower are given in Table III.

TABLE III

| $SO_2$ Scrubber Conditions: Absorbent 0/1 $CO_2/NH_3$ | | | |
|---|---|---|---|
| | $NH_3$ P.P.[1], mm Hg | $SO_2$ P.P., mm Hg | Partial Pressure Product, (mm Hg)$^2$ |
| Scrubber Bottom | 40 | 1.06 | 42.4 |
| Scrubber Top | 215 | 0.053 | 11.4 |

[1] P.P. means partial pressure

It should be noted that the partial pressure product in the contactor, as in Comparative Example A, is above the upper limit of 5 (mm Hg)$^2$ specified in the present application for this operation.

COMPARATIVE EXAMPLE C

The same operation as in Comparative Example B is performed, except that the treating solution is a mixture of aqueous ammonia and ammonium carbonate in which only one half the ammonia is introduced as carbonate. Thus, the $CO_2/NH_3$ mole ratio at the top of the $SO_2$-scrubber is 0.25/1, and it may increase or decrease as the solution proceeds down the tower absorbing $SO_2$, depending on whether the $CO_2$ is released into or absorbed from the $CO_2$-containing flue gas, a complex interplay between $CO_2$ partial pressures of $NH_3$-$CO_2$-$SO_2$-$H_2O$ solutions and the flue gas composition and operating temperature. Consider the case in which the $CO_2$ content of the solution stays unchanged. The composition at the bottom of the tower will be $SO_2/CO_2/NH_3 = 0.417/0.25/1.0$, since the $NH_3$ introduced at the top is in 20% stoichiometric excess. Again, it is expected that a blue haze would appear in the gaseous effluent of the tower.

The partial pressure of $NH_3$ and $SO_2$ and the partial pressure products at top and bottom will be as shown in Table IV.

TABLE IV

| $SO_2$ Scrubber Conditions: Absorbent 0.25/1 $CO_2/NH_3$ | | | |
|---|---|---|---|
| | $NH_3$ P.P. mm Hg | $SO_2$ P.P. mm Hg | Partial Pressure Product (mm Hg)$^2$ |
| Scrubber Bottom | 2.9 | 1.06 | 3.1 |
| Scrubber Top | 119.3 | 0.053 | 6.3 |

Again, the partial pressure product is above the upper limit of 5 (mm Hg)$^2$ specified in the present application.

EXAMPLE 1

The treating conditions and flue gas are the same as those given in the Comparative Examples, except that ammonia is introduced as ammonium carbonate i.e. with a $CO_2/NH_3$ mole ratio of 0.5/1.

Some $CO_2$ is assumed to be evolved from the descending absorbent solution as the $SO_2$ is being absorbed, resulting in a bottom composition of $SO_2/CO_2/NH_3$ of 0.417/0.4/1.

Blue haze is not expected to occur in this operation. The partial pressure and the partial pressure products are as shown in Table V.

TABLE V

| SO₂ Scrubber Conditions: Absorbent 0.5/1 CO₂/NH₃ | | | |
|---|---|---|---|
| | $NH_3$, P.P. mm Hg | $SO_2$ P.P. mm Hg | Partial Pressure Product (mm Hg)² |
| Scrubber Bottom | <1 | 1.06 | <1.0 |
| Scrubber Top | 50.3 | 0.053 | 2.7 |

The partial pressure product in Example 1 is within the range required by the present invention.

COMPARATIVE EXAMPLE D

The flue gas conditions of comparative Example D are typical of combustion products from a boiler firing a medium sulfur-containing coal. For such processes, it is generally desirable to achieve high $deNO_x$ rates with less than 10 vppm residual $NH_3$ in the flue gas. As can be seen from Table VI, the $deNO_x$ rate to maintain less than 10 vppm residual $NH_3$ is calculated to be a low value of less than 40%. However, if the residual $NH_3$ can be increased to approximately 150 vppm, then the $deNO_x$ rate of greater than 90%, is expected to be achieved. In this case, a residual $NH_3$ concentration of at least 1400 vppm (equal to the $SO_2$ concentration) could be used since an $NH_3$-based $deSO_x$ process downstream will consume the excess $NH_3$.

It should also be noted that Table VI shows that it is desirable to add the bulk of the excess $NH_3$ just upstream of the $deSO_x$ process where the flue gas is colder to conserve consumption of $NH_3$. As shown by the calculated results for $NH_3/NO_x=2.5$ and 3.0, there is an increase in the $NH_3$ injection rate of 200 vppm, but the $NH_3$ residual increases only 190 vppm (from 497.5 to 687.5 vppm). Under these two conditions, the $NO_x$ reduction remains essentially constant.

Thus, the amount of ammonia which should be injected for $NO_x$ removal purposes should be between 2.5 and 3.0 times the $NO_{xi}$ concentration of 400 vppm, or between 1000 and 1200 vppm. This amount is, as previously specified, between the sum of the moles of $NO_x$ (i.e., $1 \times 400 = 400$ vppm), plus 0.02 times the moles of $SO_x$ ($0.02 \times 1800 = 36$ vppm), or 436 vppm, and the sum of 2.5 times the moles of $NO_x$ ($2.5 \times 400 = 1000$ vppm), plus the moles of $SO_x$ ($1 \times 1800 = 1800$ vppm), or 2800 vppm. When a $NH_3/NO_{xi}$ of 2.5 is used, i.e., 1000 vppm of $NH_3$, the residual $NH_3$ in the $deNO_x$ zone effluent, per Table VI, is 49.5 vppm; to remove 1400 moles of $SO_2$ quantitatively as $(NH_4)_2SO_3$, 2800 vppm of $NH_3$ will be required. Since about 500 vppm are already in the gas, only about 2300 vppm additional ammonia has to be added to accomplish the $SO_x$ removal.

The flue gas leaving the $NO_x$ removal zone when 1000 vppm $NH_3$ are injected will comprise 497.5, about 500 vppm of residual $NH_3$ and $(0.015) \times 40$ or 6 vppm $NO_x$. Sulfur oxides, such as $SO_2$, are not affected by the $NO_x$ removal and are still at 1400 vppm. The partial pressure product of this gas, prior to entering the $SO_x$ scrubbing tower, is $1.06 \times 0.38 = 0.4$ (mm Hg)² or below the pressure range in which blue haze formation is expected.

When this gas is introduced into a $SO_x$ scrubber utilizing aqueous ammonia as absorbent composition, conditions in the scrubber will be as in Comparative Example B, Table III, and the conditions will be within the range in which formation of a blue haze would be expected.

TABLE VI

| Flue gas conditions for this calculation: | |
|---|---|
| Temperature range | 1900 to 1500° F. |
| Pressure | 1.0 atmosphere |
| Residence time | 0.2 sec |
| Initial $NO_x$ | 400 vppm |
| Excess $O_2$ | 4.2% |
| $H_2O$ | 8.6% |
| $SO_2$ | 1400 vppm |

| | $NH_3$ Injection Rate | |
|---|---|---|
| $\frac{NH_{3(mole)}}{NO_{xi}^{(1)}}$ | % deNOx | Residual NH3, vppm |
| .25 | 22.1 | 1.5 |
| .5 | 41.9 | 12.9 |
| .75 | 59.5 | 30.8 |
| 1.0 | 74.2 | 59.4 |
| 1.25 | 85.6 | 99.6 |
| 1.50 | 92.6 | 156.4 |
| 2.00 | 97.2 | 317.3 |
| 2.50 | 98.5 | 497.5 |
| 3.00 | 98.9 | 687.5 |
| 3.50 | 99.1 | 879.0 |
| 4.00 | 99.3 | 1076.0 |
| 4.50 | 99.3 | 1272.1 |
| 5.50 | 99.4 | 1666.6 |

$^{(1)}NO_{xi}$ = Initial $NO_x$

EXAMPLE 2

The operation of Comparative Example D is repeated except that instead of using aqueous ammonia as absorbent composition, an aqueous ammonium carbonate/bicarbonate absorbent composition is used having a $CO_2/NH_3$ mole ratio of $0.5/(1-0.2)=0.625/1$. The 0.2 represents the 20% of the ammonia required for $SO_2$ absorption which is present in the flue gas as unreacted (excess) ammonia left over from the $deNO_x$ operation.

The conditions at the bottom of the tower will be the same as in Example 1, since the excess ammonia from the $deNO_x$ operation will be absorbed into the descending aqueous absorbent composition, or alternatively, the equivalent amount of $NH_3$ will not be released from that aqueous absorbent composition to meet its $NH_3$ partial pressure requirement. Furthermore, some $CO_2$ will be released as the aqueous absorbent composition descends in the tower. The composition of the aqueous absorbent at the top is, therefore, $0/0.625/1$ $SO_2/CO_2/NH_3$, and $0.417/0.4/1$ $SO_2/CO_2/NH_3$ at the bottom.

The partial pressures and partial pressure products are shown in Table VII.

TABLE VII

| SO₂ - Scrubber Conditions: Absorbent 0.625/1 CO₂/NH₃ | | | |
|---|---|---|---|
| | $NH_3$ P.P. mm Hg | $SO_2$ P.P. mm Hg | Partial Pressure Product (mm Hg)² |
| Scrubber Bottom | <1 | 1.06 | <1.0 |
| Scrubber Top | 29 | 0.053 | 1.5 |

Under the conditions shown in Table VII, a blue haze is not expected to form since the conditions fall within the ranges defined in the present invention. Note that the effluent flue gas comprises 6 vppm $NO_x$ and 70 vppm $SO_x$ which is well within even the most stringent emissions limitations presently imposed.

What is claimed is:

1. A process for removing sulfur oxides from a gaseous mixture containing the same, which comprises contacting, in an absorption zone, at absorption conditions, said gaseous mixture with an aqueous composition comprising an ammonium salt selected from the group consisting of ammonium carbonate, ammonium bicarbonate, and mixtures thereof, in an amount such that the product of the partial pressures of said sulfur oxides and ammonia over said aqueous composition, measured at 140 degrees F., is not greater than about 5 (mm Hg)$^2$, in said absorption zone, to produce a gaseous product having a decreased content of said sulfur oxides.

2. The process of claim 1, wherein said product of said partial pressures is less than about 2 (mm Hg)$^2$.

3. The process of claim 1, wherein said sulfur oxides-containing gaseous mixture is contacted with said ammonium salt-containing aqueous composition in an amount sufficient to provide a mole ratio of at least 1 mole of ammonia contained in said salt per mole of said sulfur oxide.

4. The process of claim 1, wherein said sulfur oxides-containing gaseous mixture is contacted with said ammonium salt-containing aqueous composition in an amount sufficient to provide a mole ratio of ammonia in said salt to said sulfur oxides ranging from about 1:1 to about 10:1.

5. The process of claim 1, wherein said aqueous composition has a $CO_2/NH_3$ mole ratio of at least 0.5:1.

6. The process of claim 1, wherein said aqueous composition has a $CO_2/NH_3$ mole ratio of at least 0.75:1.

7. The process of claim 5, wherein said aqueous composition having a $CO_2/NH_3$ mole ratio of at least 0.5:1 is prepared by scrubbing at least a portion of said gaseous mixture with an aqueous ammonia solution.

8. The process of claim 1, wherein said aqueous composition also comprises ammonia.

9. The process of claim 1, wherein said absorption conditions include a temperature ranging from about 100 degrees F. to about 150 degrees F.

10. A combination denitrogenation and desulfurization process which comprises the steps of:
(a) contacting a gaseous mixture comprising nitrogen oxides and sulfur oxides in the presence of oxygen and in the absence of a catalyst, with ammonia in a molar amount equal to the sum of about 1.0 to about 3.0 times the moles of said nitrogen oxides plus about 0.01 to about 2.0 times the moles of said sulfur oxides to reduce said nitrogen oxides to nitrogen, at a temperature ranging from about 1300 to about 2200 degrees F.;
(b) passing the gaseous product resulting from step (a) comprising nitrogen, said sulfur oxides and unreacted ammonia to an absorption zone maintained at absorption conditions to contact an aqueous composition comprising an ammonium salt selected from the group consisting of ammonium carbonate, ammonium bicarbonate, and mixtures thereof, in an amount such that the product of the partial pressures of said sulfur oxides and ammonia over said aqueous composition, measured at 140 degrees F., is not greater than about 5 (mm Hg)$^2$, in said absorption zone, to produce a gaseous effluent having a decreased amount of said sulfur oxides, and an ammonium salt of an acid of sulfur; and
(c) recovering said ammonium salt of an acid of sulfur.

11. The process of claim 10, wherein said product of said partial pressures is less than about 2 (mm Hg)$^2$.

12. The process of claim 10, wherein said gaseous product resulting from step (a) is contacted with said ammonium salt-containing aqueous composition in an amount sufficient to provide a mole ratio of at least 1 mole of ammonia contained in said salt per mole of said sulfur oxides.

13. The process of claim 10, wherein said gaseous product of step (a) is contacted with said ammonium salt-containing aqueous composition in an amount sufficient to provide a mole ratio of ammonia contained in said salt to said sulfur oxides ranging from about 1:1 to about 10:1.

14. The process of claim 10, wherein in step (b), said aqueous composition has a $CO_2/NH_3$ mole ratio of at least $0.5/(1-0.01x)$, wherein x is the % of $NH_3$ required for $SO_x$ removal supplied by said unreacted ammonia of said gaseous product resulting from step (a).

15. The process of claim 10, wherein in step (b), said aqueous composition has a $CO_2/NH_3$ mole ratio of at least $0.5/(1-0.015x)$, wherein x is the % $NH_3$ required for $SO_x$ removal supplied by said unreacted ammonia of said gaseous product resulting from step (a).

16. The process of claim 10, wherein said absorption conditions include a temperature ranging from about 100 degrees F. to about 150 degrees F.

17. The process of claim 10 wherein said ammonia in step (a) is present in a molar amount ranging from the sum of about the moles of said nitrogen oxides plus 0.02 times the moles of said sulfur oxides to the sum of 2.5 times the moles of said nitrogen oxides plus the moles of said sulfur oxides.

18. The process of claim 10 wherein in step (a) said gaseous mixture is contacted with said ammonia and with an additional reducing agent and wherein said temperature in step (a) ranges from about 1300 to about 1600 degrees F.

19. The process of claim 10 wherein said oxygen in step (a) is present in an amount ranging from about 0.1 to about 20 volume percent based on the volume of said gaseous mixture.

20. The process of claim 10 wherein said recovered ammonium salt is heated to a temperature ranging from about 500 to about 3000 degrees F. to produce elemental sulfur.

21. The process of claim 10 wherein said recovered ammonium salt is decomposed at a temperature ranging from about 225 to 800 degrees F. into a gaseous mixture comprising ammonia and sulfur oxides and, subsequently, the resulting sulfur oxides and ammonia are reacted at a temperature ranging from about 500 to about 3000 degrees F. to produce elemental sulfur.

22. The process of claim 10 wherein said recovered ammonium salt comprises ammonium sulfite and wherein said ammonium sulfite is subjected to oxidation to form ammonium sulfate.

23. The process of claim 10 wherein said gaseous mixture of step (a) is a combustion effluent.

* * * * *